(12) United States Patent
Knigge et al.

(10) Patent No.: US 8,701,874 B2
(45) Date of Patent: Apr. 22, 2014

(54) CONVEYOR

(75) Inventors: Darrell Keith Knigge, Wetmore, CO (US); Thomas Quintin Harding, Canon City, CO (US)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 13/491,905

(22) Filed: Jun. 8, 2012

(65) Prior Publication Data
US 2013/0327617 A1    Dec. 12, 2013

(51) Int. Cl.
*B65G 15/62* (2006.01)

(52) U.S. Cl.
CPC .................................. *B65G 15/62* (2013.01)
USPC ............ 198/831; 198/832; 198/839; 198/841

(58) Field of Classification Search
USPC ................. 198/831, 832, 835, 838, 839, 841
See application file for complete search history.

(56) References Cited

U.S. PATENT DOCUMENTS

| | | | | |
|---|---|---|---|---|
| 2,413,339 A * | 12/1946 | Stadelman | .................... | 198/831 |
| 3,115,263 A * | 12/1963 | Leslie-Smith | ................ | 215/12.1 |
| 3,788,455 A * | 1/1974 | Dieckmann, Jr. | .............. | 198/831 |
| 3,817,355 A * | 6/1974 | Haase | ............................ | 198/813 |
| 4,206,994 A * | 6/1980 | Silverberg et al. | ............ | 399/165 |
| 4,358,010 A * | 11/1982 | Besch | ............................ | 198/838 |
| 4,655,340 A * | 4/1987 | Steel | ............................ | 198/839 |
| 4,834,839 A * | 5/1989 | Harrison | ........................ | 198/839 |
| 4,930,617 A * | 6/1990 | Lavoie et al. | ................. | 198/692 |
| 4,930,621 A * | 6/1990 | Brown et al. | ................. | 198/831 |
| 5,052,548 A * | 10/1991 | Andrews | ........................ | 198/817 |
| 5,060,788 A * | 10/1991 | Compton et al. | ............. | 198/831 |
| 5,083,657 A * | 1/1992 | Kelsey | ............................ | 198/811 |
| 5,164,777 A * | 11/1992 | Agarwal et al. | ................ | 399/165 |
| 5,415,273 A * | 5/1995 | Peterson | ........................ | 198/831 |
| 5,605,222 A * | 2/1997 | Huberty et al. | ................ | 198/841 |
| 5,692,597 A * | 12/1997 | Ferguson | ....................... | 198/841 |
| 5,743,379 A * | 4/1998 | Warnecke | ....................... | 198/839 |
| 5,860,512 A * | 1/1999 | Gianvito et al. | .............. | 198/841 |
| 6,298,982 B1 * | 10/2001 | Layne et al. | .................. | 198/831 |
| 6,662,937 B2 * | 12/2003 | Warnecke | ....................... | 198/831 |

(Continued)

FOREIGN PATENT DOCUMENTS

DE    4102649 A1    8/1992
DE    4136156 A1    6/1993

(Continued)

OTHER PUBLICATIONS

English Abstract of Japan 2002-109627, 1 page.

(Continued)

*Primary Examiner* — Mark A Deuble
(74) *Attorney, Agent, or Firm* — Gerald E. Hespos; Michael J. Porco; Matthew T. Hespos (57) ABSTRACT

Conveyors are disclosed herein. An embodiment of a conveyor includes a bed having a first end and a second end, wherein a belt is slidable on the bed. The belt is in a first portion of its travel when it is located adjacent the bed and the belt is in a second portion of its travel when it is located opposite the bed. A curve is located on the first end of the bed, wherein the belt contacts at least a portion of the curve as the belt transitions between the first portion of travel and the second portion of travel.

18 Claims, 9 Drawing Sheets

(56) References Cited

U.S. PATENT DOCUMENTS

| | | |
|---|---|---|
| 6,851,543 B2 | 2/2005 | Nakanishi |
| 7,246,697 B2 * | 7/2007 | Hosch et al. ............... 198/831 |
| 7,673,741 B2 * | 3/2010 | Nemedi ...................... 198/841 |
| 7,832,549 B2 * | 11/2010 | Honeycutt .................. 198/831 |
| 2007/0017786 A1 * | 1/2007 | Hosch et al. ............... 198/841 |
| 2008/0110726 A1 | 5/2008 | Helgert |
| 2010/0108474 A1 * | 5/2010 | Knigge et al. .............. 198/805 |

FOREIGN PATENT DOCUMENTS

| | | |
|---|---|---|
| EP | 1155773 A1 | 11/2001 |
| EP | 1702868 A1 | 9/2006 |
| JP | 60-31427 | 2/1985 |
| JP | 6-345233 | 12/1994 |
| JP | 2002-109627 | 4/2002 |
| SU | 630141 | 10/1978 |
| WO | 0206142 A1 | 1/2002 |
| WO | 2008002758 A1 | 1/2008 |
| WO | 2008008029 A1 | 1/2008 |

OTHER PUBLICATIONS

English Abstract of Japan 60-31427, 2 pages.
International Search Report of International Application No. PCT/US2013/044514 dated Oct. 4, 2013, 3 pages.
English Abstract of German 4136156, 2 pages.
English Abstract of Japan 6-345233, 2 pages.
English Abstract of German 4102649, 1 page.
European Search Report dated Aug. 12, 2013, 3 pages.

* cited by examiner

CONVEYOR

BACKGROUND

Some conveyors use a moving belt to convey items from one point to another. The conveyors have pulleys or rollers on each end that keeps the tension on the belt at a predetermined tension. A motor coupled to the belt or a motorized pulley may move the belt. When the belt is under tension, there is friction between the motorized pulley and the belt that enables the pulley to grab the belt and move the belt as the pulley rotates.

The motorized pulleys are very difficult to implement when the conveyor is curved. More specifically, the belt on a curved conveyor tends to migrate toward the center of the radius of the curve, which causes the pulleys to lose contact with the belt. Accordingly, the belt loses tension so there is no friction between the belt and the pulley and movement of the belt stops.

A chain or other device attached to the belt may be used to move the belt around a curve. A sprocket may move the chain in a conventional manner, which in turn causes the belt to move. The sprocket has several components associated with it and tends to limit the amount of force that the belt uses to move an item.

SUMMARY

Conveyors that use belts to convey items are disclosed herein. The belts are attached to a cam follower that is received into a cam or groove that spirals around the exterior surface of a drum. As the drum rotates, the cam follower moves within the cam. The movement of the cam follower in the cam causes the belt to move.

The cam drive enables the belt to move irrespective of the tension on the belt applied by the rollers or pulleys. In addition, the cam drive can apply a great deal of force to the belt to move heavy items.

DETAILED DESCRIPTION

Figure 1:
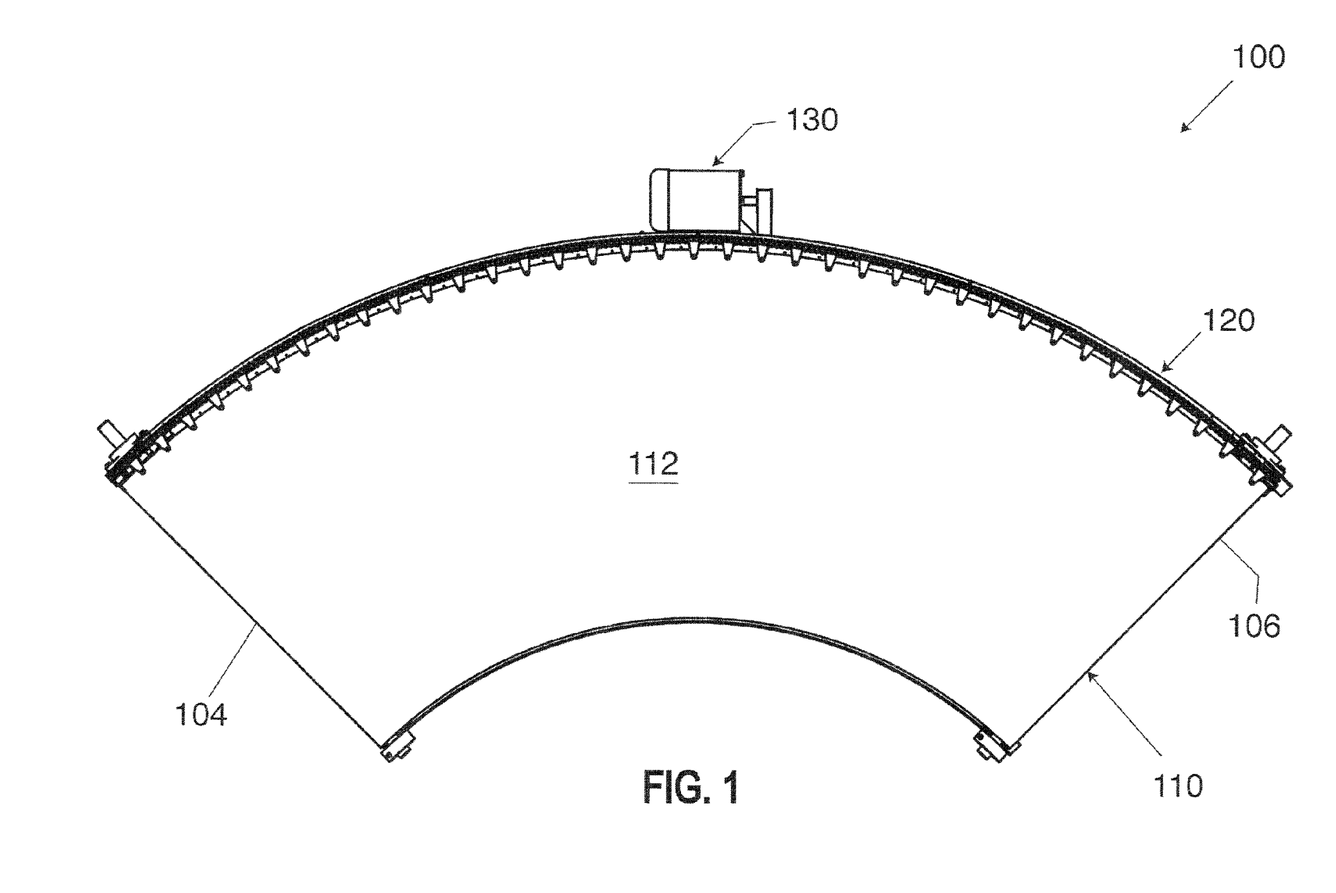
FIG. 1 is a top plan view of an embodiment of a conveyor.

Embodiments of conveyors that use a drum cam with a cam follower are disclosed herein. As described below, the use of a cam with a cam follower decreases the complexity of the conveyors and increases the load that may be moved by the conveyors. An example of such a conveyor 100 is shown in FIG. 1, which is a top plan view of the conveyor 100. The conveyor 100 has a first end 104 and a second end 106 wherein items are conveyed between the first end 104 and the second end 106 along a curve. Although the conveyor 100 is curved, the disclosures provided herein may also be applied to straight conveyors.

The conveyor 100 has a continuous belt 110 that is cut to fit the curve of the conveyor 100. The belt 110 has a top surface 112 on which items are conveyed. Accordingly, items are placed onto the top surface 112 of the belt 110 at the first end 104 and conveyed along the curve to the second end 106. The belt 110 may be any transfer medium, such as a fabric or other conventional belt material, such as metal, chain, and slats.

Figure 2:
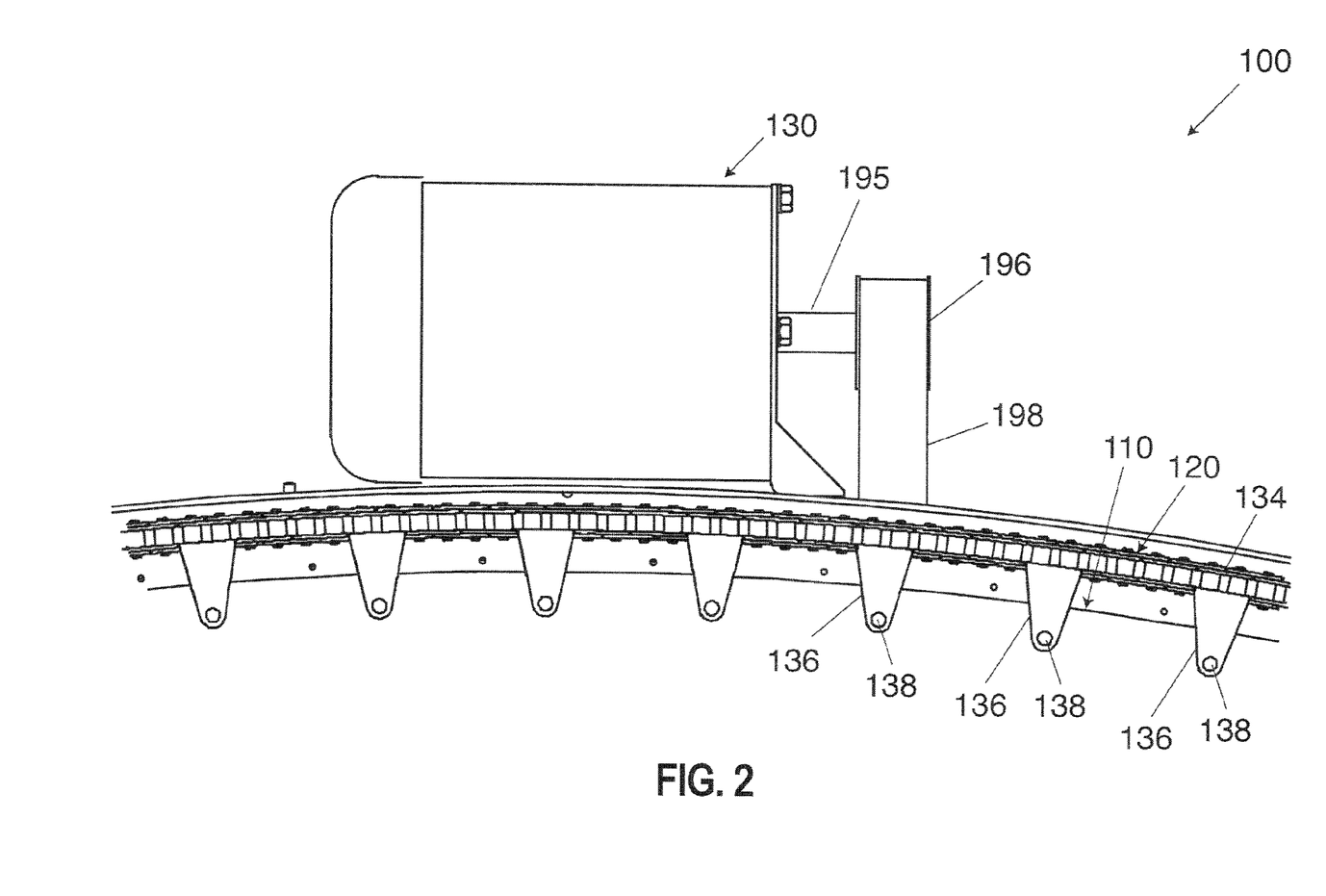
FIG. 2 is an enlarged plan view of the conveyor of FIG. 1 showing the belt, chain, and motor.

The belt 110 may be attached to a propelling mechanism, which in some of the embodiments described herein is a chain 120. The chain 120 in conjunction with a motor 130 serves to move the belt 110 as described in greater detail below. An enlarged view of the chain 120 and the belt 110 are shown in FIG. 2, which is an enlarged view of the conveyor 100 in the proximity of the motor 130. The chain 120 includes a plurality of links 134 that may be substantially similar to links used in conventional chains. Some links 134 have attachment members 136 attached thereto. The attachment members 136 have holes located therein that support securing devices 138. The securing devices 138 secure the attachment members 136 to the belt 110. The securing devices 138 may, as an example, be rivets or screws. In summary, the motor 130 drives the chain 120, as described in greater detail below, which moves the belt 110 with it.

The use of the chain 120 to move the belt 110 has many advantages over pulley-driven belts. For example, a belt in a curved conveyor will tend to wander toward the center of the radius of the curve, which reduces the tension on the belt, which in turn, reduces the friction between the pulleys and the belt. Accordingly, the belt tends to slide on the pulleys rather than being moved by the pulleys. This lack of friction is not an issue with a chain drive because the belt 110 is driven by the chain irrespective of the friction between the belt 110 and the pulleys. The chain 120 also enables more driving force to be applied to the belt 110. More specifically, the chain 120 can typically transmit a higher force to items on the belt 110 than can be transmitted via a friction drive of a pulley.

Figure 3:
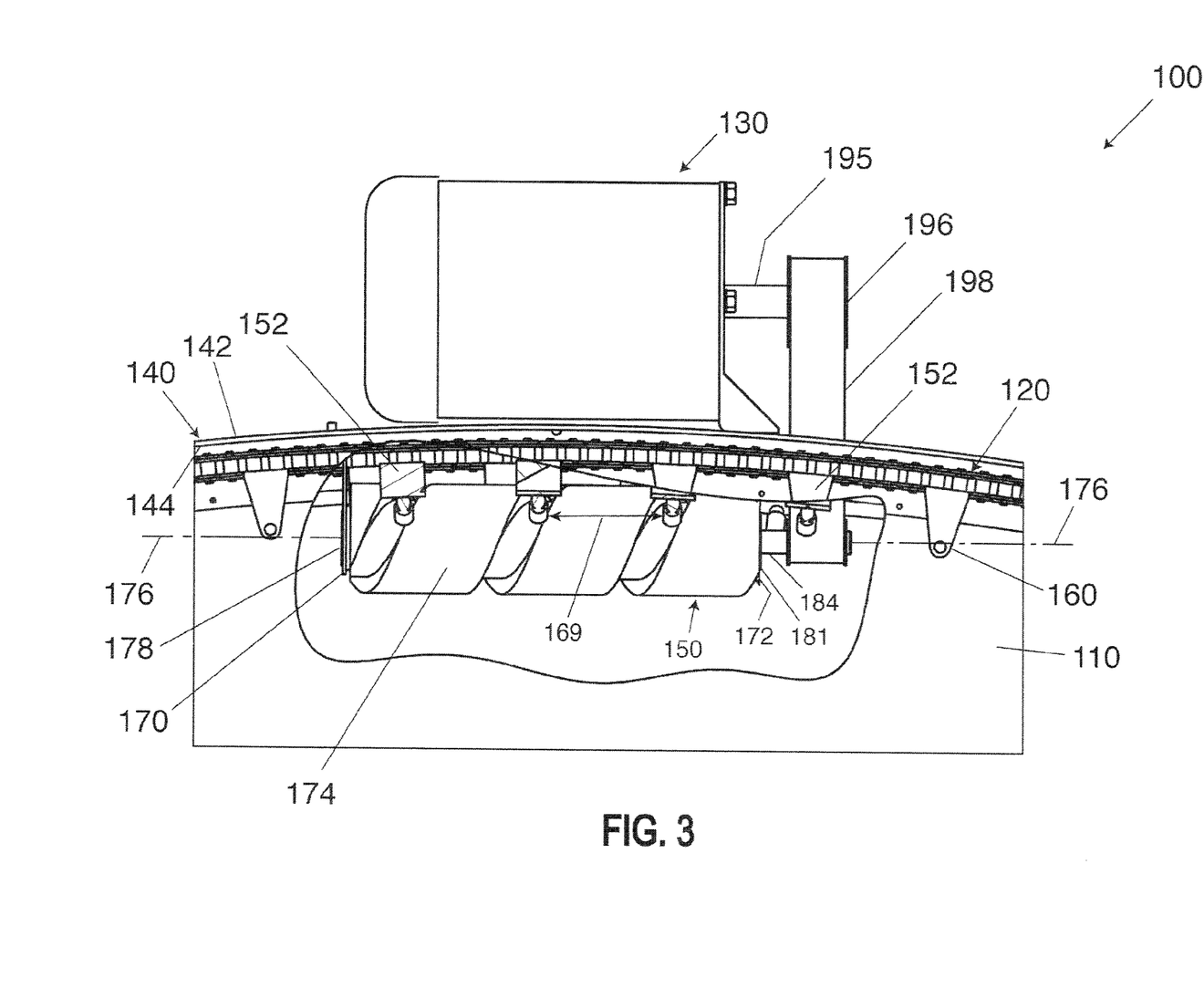
FIG. 3 is a view of the conveyor of FIG. 2 with a portion of the belt removed in order to view the cam drum.
Figure 4:
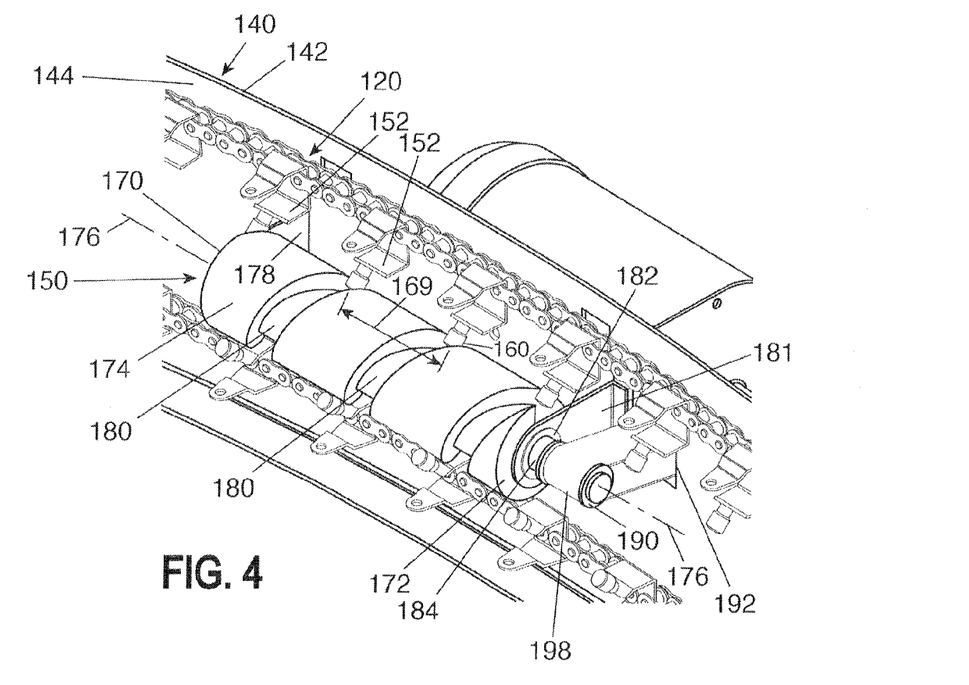
FIG. 4 is a perspective view of the conveyor in the proximity of the motor with the belt removed.

Reference is made to FIGS. 3 and 4 to show the conveyor 100 in the proximity of the motor 130 with the belt 110 removed. FIG. 3 is a top plan view of the conveyor 100 proximate the motor 130 with a portion of the belt 110 removed, but the chain 120 remaining. FIG. 4 is an isometric view of the conveyor 100 proximate the motor 130 with the entire belt removed. FIGS. 3 and 4 show an outer wall 140 of the conveyor 100. The outer wall 140 has an outer surface 142 and an inner surface 144. In the embodiments of the conveyor 100 described herein, the motor 130 is attached to the outer surface 142, however, it could be attached to other structural members of the conveyor 100, including the inner surface 144. As shown in FIGS. 3 and 4 and described in greater detail below, the chain 120, and thus, the belt 110, are driven by a drum 150 that is rotated by the motor 130.

Figure 5:
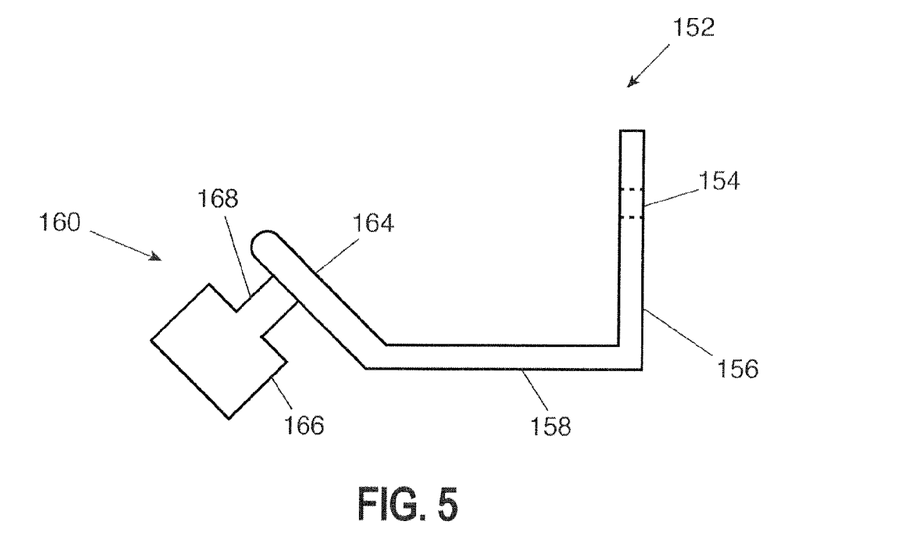
FIG. 5 is a side elevation view of the drive mechanism and cam follower of FIG. 4.

Referring again to the chain 120, a plurality of drive mechanisms 152 are attached to the chain 120. In the embodiments of FIGS. 3 and 4, the drive mechanisms 152 are connected to the links 134 of the chain 120. A side view of a drive mechanism 152 is shown in FIG. 5. The drive mechanism 152 includes a mounting portion 156 or first portion that attaches to the chain 120. In the embodiments described herein, the mounting portion 156 may have holes 154 that secure the mounting portion 156 to the links 134 of the chain 120. An extension portion 158 or second portion extends from the mounting portion 156. As described in greater detail below, the extension portion 158 serves to maintain a cam follower 160 a distance from the chain 120. A mounting portion 164 or third portion is connected to the extension portion 158. The mounting portion 164 provides a mechanism on which the cam follower 160 is attached. In other embodiments, the cam follower 160 is mounted directly to the chain 120 or directly to the belt 110.

In the embodiment of FIGS. 3-5, the cam follower 160 includes an engagement portion 166 and a shaft 168, wherein the shaft 168 is connected between the mounting portion 164 and the engagement portion 166. In some embodiments, the engagement portion 166 is a roller that is rotatable about the shaft 168 and in other embodiments, the shaft 168 and the engagement portion 166 rotate about a connector or the like (not shown) that connects the shaft 168 to the mounting portion 164. In other embodiments, the engagement portion 166 does not rotate. In the embodiments of FIGS. 3-5, the engagement portion 166 is a cylindrical piece that is configured to be received in the cam 180 in the surface 174 of the drum 150 as described in greater detail below.

The cam followers 160 are spaced a distance 169 from each other. As described below, this distance 169 corresponds to the pitch of the cam 180 in the drum 150. In other embodiments, the distance 169 is a multiple of the spacing or pitch in the drum 150 as described below. In any event, the distance 169 must enable cam followers 160 that are moved to the drum 150 to be engaged in the cam 180. Otherwise, the cam followers 160 will contact the outer surface 174 of the drum 150 without being moved by the cam 180.

Figure 6:
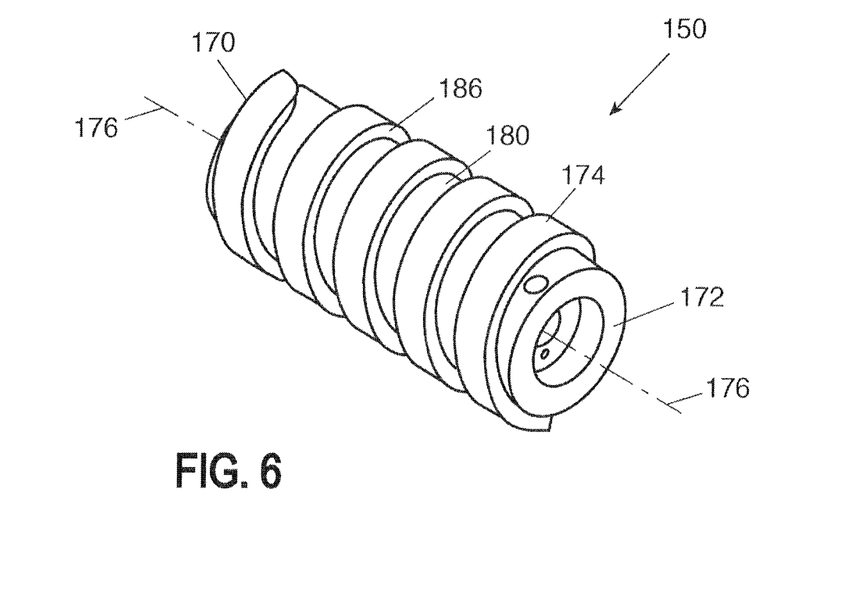
FIG. 6 is an isometric view of an embodiment of the cam drum of FIGS. 3 and 4.
Figure 7:
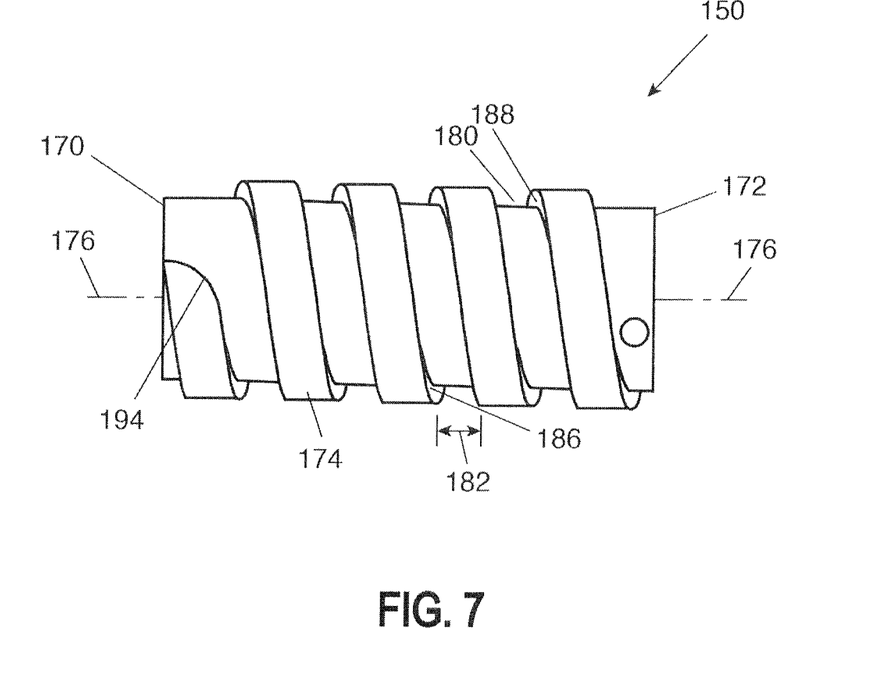
FIG. 7 is an elevation view of the cam drum of FIG. 6.

Reference is made to FIGS. 6 and 7 which are views of the drum 150 of FIGS. 3 and 4. FIG. 6 is an isometric view of the drum 150 and FIG. 7 is an elevation view of the drum 150. The drum 150 is substantially cylindrical with a first end 170 and a second end 172. A surface 174 extends between the first surface 170 and the second surface 172. For reference, an axis 176 extends through the drum 150 between the first end 170 and the second end 172. The drum 150 is rotatable about the axis 176.

The drum 150 has a cam 180 spiraling around the surface 174 between the first end 170 and the second end 172. The cam 180 has a width 182 extending between a first wall 186 and a second wall 188, wherein the walls 186, 188 may be substantially perpendicular to the surface 174. The walls 186, 188 are configured to contact the engagement portion 166, FIG. 5. However, the width 182 between the walls 186, 188 is greater than the diameter of the engagement portion 166 so that the engagement portion 166 can rotate as it contacts one of the walls 186, 188. In the case of a nonrotating cam follower, the width 182 may be larger than the cam follower in order to prevent the cam follower from binding in the cam 180 as the cam follower moves within the cam 180.

The cam 180 has a pitch associated with it, wherein the pitch is the number of revolutions of the cam 180 per unit of distance between the first end 170 and the second end 172. In the embodiment of FIGS. 3 and 4, the pitch is equal to the distance 169 between the cam followers 160. However, the pitch may be tighter wherein it is a multiple of the distance 169. For example, the pitch could be half the distance 169 as shown in FIGS. 6 and 7. In such an embodiment, the belt 110 will travel half the distance 169 for every rotation of the drum 150. While the velocity of the belt 110 is decreased with a tighter pitch, the force applied to the belt 110 to move items is increased. More specifically, the alternative pitch will cause the belt 110 to move slower, but it will be able to convey heavier items.

The cam 180 has a curved section 194 located proximate the first end 170. It is noted that the cam 180 may have a similar curved section located proximate the second end 172. The curved portion 194 provides a wide opening for the cam 180 to accept the cam follower 160 as it enters the cam 180. If the cam follower 160 is not in alignment with the cam 180 as it approaches the drum 150, the cam follower 160 may not enter the cam 180 or it may get bound. The curved portion 194 overcomes these problems by opening the cam 150 to enable a misaligned cam follower 160 to enter the cam 180.

Reference is again made to FIGS. 3 and 4 to show the attachment of the motor 130 and the drum 150 within the conveyor 100. As shown, the motor 130 attaches to the outer surface 142 of the outer wall 140. Several different types of mechanisms may be used to attach the motor to the outer wall 140. The motor 130 has an output shaft 195 that is connected to a pulley 196. As described in greater detail below, the motor 130 turns a belt 198 by way of the pulley 196.

The drum 150 has bearings and supports at each end 170, 172 that enable it to mount to the inner surface 144 of the wall 140 and rotate about the axis 176. As shown in FIGS. 3 and 4, the first end 170 of the drum 150 is rotatably attached to a first bracket 178. For example, a bearing or the like may be located between the first end 170 and the first bracket 178 that enables the drum 150 to rotate about the axis 176. A second bracket 181 is connected between the second end 172 of the drum 150 and the inner wall 144. A bearing 182 is located in the second bracket 181. In this embodiment, a shaft 184 is attached to the second end 172 of the drum 150, wherein the shaft 184 passes through the bearing 182. The bearing 182 enables the shaft 184, which is attached to the drum 150, to rotate relative to the second bracket 181. A pulley 190 is attached to the shaft 184 in order to rotate the drum 150 by way of the motor 130 and the belt 198.

The wall 140 has a hole 192 located therein for the belt 198 to pass through. The belt 198 is connected between the pulley 196 on the motor 130 and the pulley 190 on the drum 150. This connection between the motor 130 and the drum 150 enables the motor 130 to be located on the exterior of the conveyor 100, which allows for easy maintenance of the motor 130. In other embodiments, the motor 130 may be located within the conveyor 100. Additionally, it is noted that other mechanisms may be used to drive the drum 150. For example, gears, chains or the like may be used between the motor 130 and the drum 150. In some embodiments described below, a flexible shaft may be used between the motor 130 and the drum 150, which enables the motor 130 to be located virtually anywhere.

Having described the components of some embodiments of the conveyor 100, its operation will now be described. During operation of the conveyor 100, the motor 130 turns the pulley 196, FIG. 2. The pulley 196 turns the belt 198, which turns the pulley 190 on the drum 150. Accordingly, the drum 150 rotates about the axis 176. The bearing 182 along with the bearing in the first bracket 178 keep the drum 150 in a fixed position relative to the wall 140 while allowing the drum 150 to rotate.

The rotation of the drum 150 causes the cam follower 160 to move within the cam 180. Because the drum 150 is affixed to the wall 140, the drum 150 cannot move. Therefore, the cam follower 160 moves in the cam 180, which moves the chain 120 and the belt 110. By reversing the direction of the motor 130 the direction in which the drum 150 is reversed, which causes the belt 110 to move in the opposite direction.

The conveyor 100 described herein has many advantages over conventional conveyors. For example, conventional conveyors rely on a complicated sprocket mechanism to move the chain 120. The conveyor 100 uses a much simpler drum 150 that is engaged with the cam follower that is attached to the chain 120. Sprockets may be used in the conveyor 100, but they are only required to guide the chain 120 over the end rollers of the conveyor 100 and are not required to drive the chain 120.

Having described some embodiments of the conveyor 100 and its operation, other embodiments will now be described. The motor 130 and drum 150 may be affixed to an assembly (not shown) in the conveyor 100, which is sometimes referred to as a first assembly. The first assembly is removable from the conveyor 100, which enables easy access to the drum 150 and the motor 130. It is noted that in many embodiments, the cam followers 160 sit in the cam 180 without any retaining mechanisms. Therefore, the drum 150 can be easily removed from the cam followers 160. In some embodiments, the first assembly is on rails or other sliding type devices that enable it to be slid relative to the outer wall 140. Therefore, access to the motor 130 and drum 150 is achieved by sliding the first assembly from the outer wall 140.

The first assembly may be associated with a second assembly, such as a door. The second assembly may seal the opening used by the first assembly in order to prevent people or objects from interfering with the motor 130 and/or the drum 150.

In another embodiment, the drum 150 is removable from either the inner surface 144 of the outer wall 140 or the above-described second assembly. For example, screws or the like may be used to retain the drum 150 into position. This enables quick replacement of the drum. Should the user of the conveyor 100 require more torque, he can readily replace the drum with a drum having a tighter pitch, which will provide more force to move to the belt 110. With conventional conveyors, sprockets had to be changed or the motor or a gearbox coupled to the motor had to be changed in order to change the force delivered to the belt.

In some embodiments, the cam followers 160 may tend to rise out of the cam 180. For example, there may be some play in the chain 120 that may enables the cam followers 160 to move relative to the cam 180 and possibly out of the cam 180. To overcome this possible problem, guides (not shown) may be affixed to the inner surface 144 of the wall 140 or other similar locations. The guides serve to retain the cam followers 160 in a fixed location relative to the drum 150 as they pass in the cam 180. In similar embodiments, the guides may cause the drive mechanisms 152 to remain in a fixed position relative to the drum 150. By using either of these guide configurations, the tendency for the cam followers 160 to come out of the cam 180 is reduced.

Referring again to FIG. 5, the shape of the cam 180 may also be configured so as to retain the cam follower 160 within the cam 180. Additional reference is made to FIG. 8 which is a side cut away view of an embodiment of the drum 150 with a cam 200 that prevents the cam follower 160 from disengaging from the cam 200. The cam 200 is in substantially the same shape as the engagement portion 166 on the cam follower 160. More specifically, the cam 200 has a wide portion 204 and a narrow portion 206. The wide portion 204 is bounded by a first wall 208 and a second wall 210, wherein the width of the wide portion 204 is the distance between the first wall 208 and the second wall 210. The width of the wide portion 204 may be slightly greater than the diameter of the engagement portion 166, which enables the engagement portion 166 to be received in the wide portion 204 and rotate when it contacts the first wall 208 or the second wall 210. The narrow portion 206 of the cam 200 is slightly greater than the diameter of the shaft 168 that supports the engagement portion 166.

Figure 8:
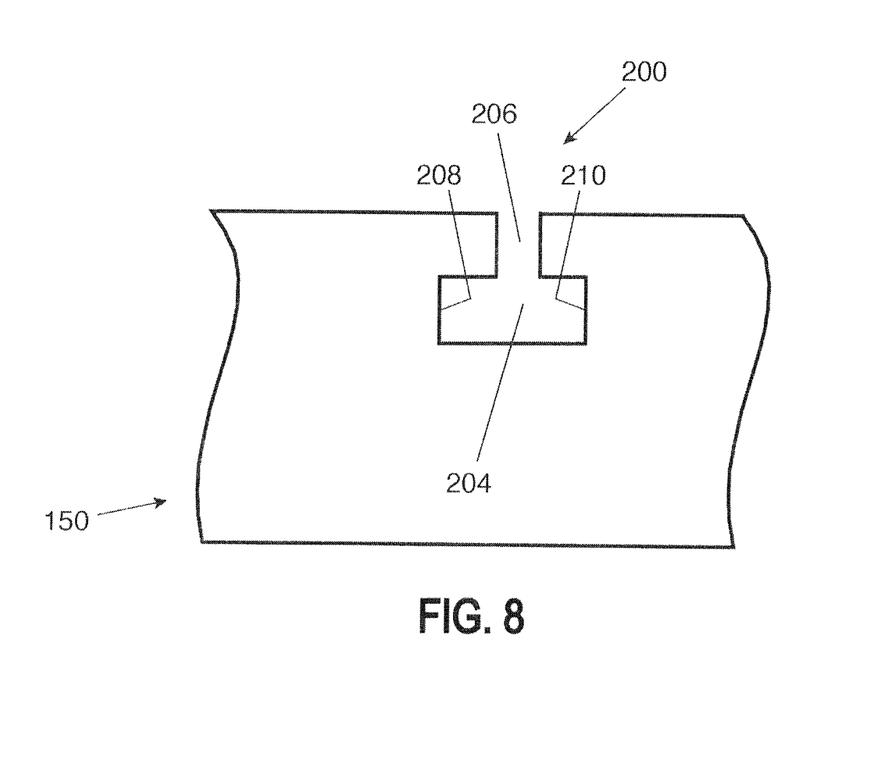
FIG. 8 is a cut away view of an embodiment of the drum of FIGS. 6 and 7 wherein the cam is configured to retain the cam follower.

In use, the engagement portion 166 of the cam follower 160 contacts either the first wall 208 or the second wall 210 of the cam 200. For example, if the drum 150 is rotating in a first direction, the engagement portion 166 will contact the first wall 208. When the drum 150 rotates in the opposite direction, the engagement portion 166 will contact the second wall 210. The engagement portion 166 is too large to fit through the narrow portion 206, so it will be prevented from being disengaged from the cam 200.

Figure 9:
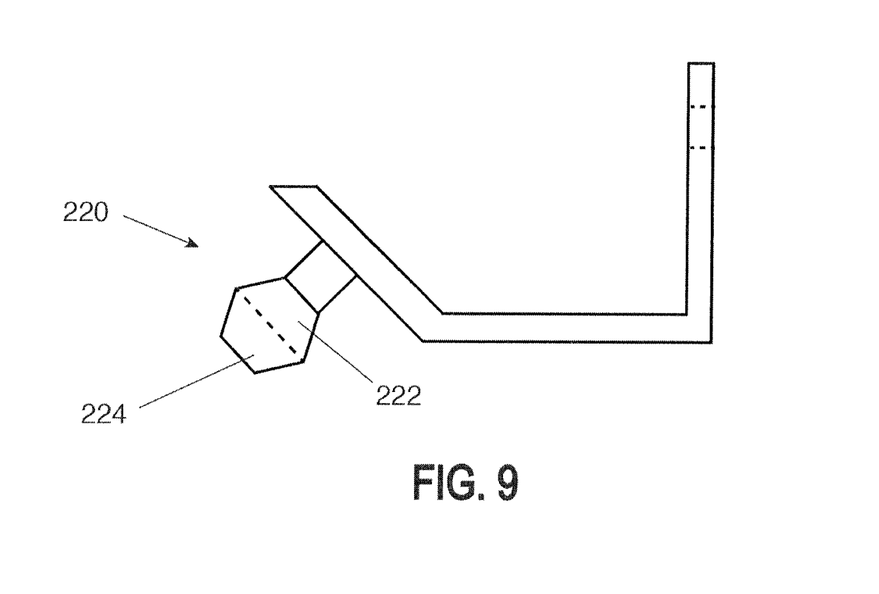
FIG. 9 is another embodiment of a cam follower.

When the cam follower 160 is used with the cam 200, there is a possibility that portions of the engagement portion 166 other than the outer circumference will contact the contours of the cam 200. This contact may cause wear on the cam 200 or the cam follower 160. Different cam followers may be used to overcome this wearing problem. Reference is made to FIG. 9, which is an embodiment of a cam follower 220 that may cause less wear on its associated cam. It is noted that the cam follower 220 would not likely be used in the cam 200 due to the devices having substantially different cross sectional shapes. The cam follower 220 is partially diamond-shaped and has an upper portion 222 and a lower portion 224. The cam for the cam follower 220 may be substantially the same shape as the cam 220. Accordingly, either the top portion 222 or the lower portion 224 of the cam follower 220 may contact the cam. It is noted that the cam follower 220 may be rigidly fixed so as not to rotate within the cam.

As stated above, there are embodiments wherein the engagement piece 166 is not rotatable, but slides against cam 150. For example, the cam follower 220 may not rotate, but rather may slide within its associated cam. One embodiment of a nonrotating cam follower is one that has the substantial shape of a dove tail. The dove tail-shaped cam follower may slide in the cam rather than rotate. Lubricating devices may be used within the conveyor to lubricate the cam in order to reduce the friction between the cam and the cam follower. Such lubricating devices may be used with both rotating and stationary cam followers.

Figure 10:
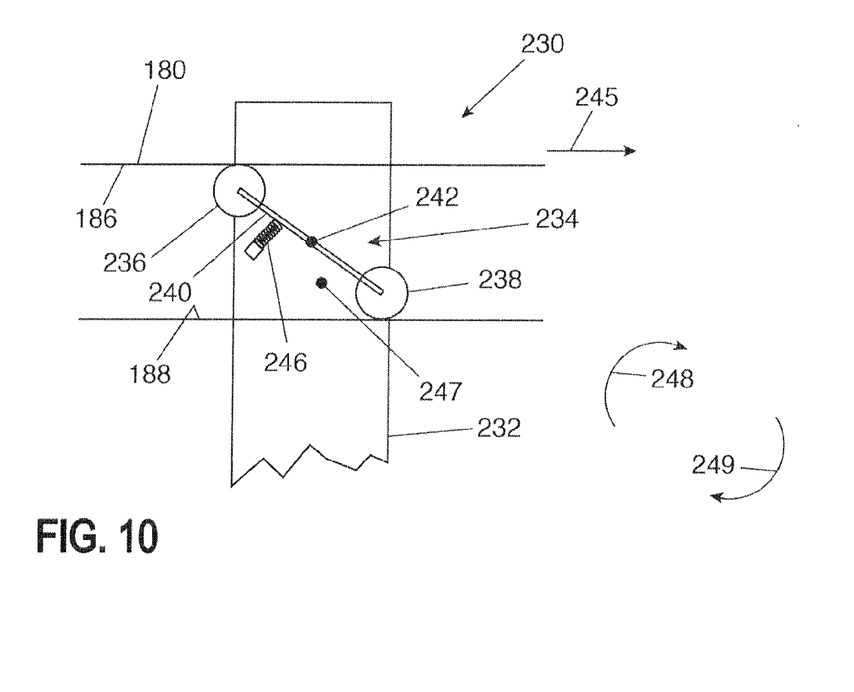
FIG. 10 is a bottom view of an embodiment of a cam mechanism.
Figure 11:
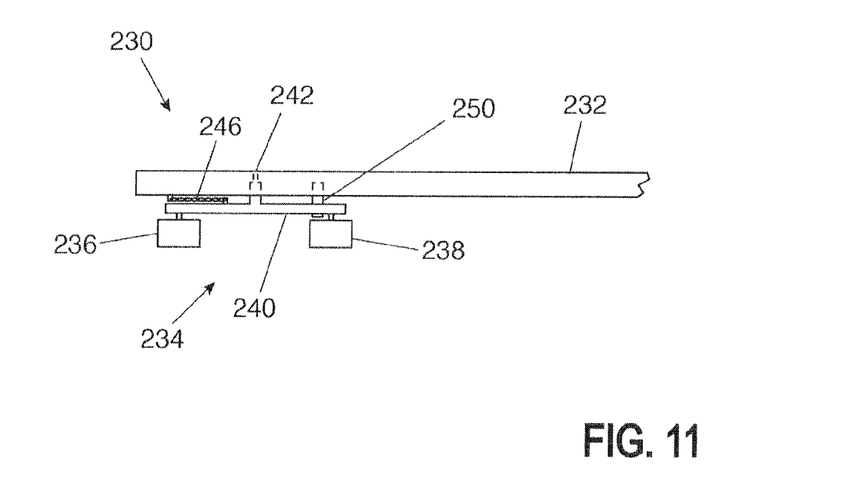
FIG. 11 is a side view of the cam mechanism of FIG. 10.

Reference is made to FIG. 10, which is a bottom view of a cam mechanism 230 and FIG. 11, which is a side view of the cam mechanism 230. The cam mechanism 230 includes an arm 232 which may be connected to the belt 110, FIG. 2, or the chain 120 in a manner similar to the manner in which the drive mechanism 152 is connected to the belt 110 or chain 120. The cam mechanism 230 has a cam follower 234 that has two engagement pieces, a first engagement piece 236 and a second engagement piece 238. The engagement pieces 236, 238 are connected to each other by a connector 240. The connector 240 is pivotally connected to the arm 232 at a pivot point 242. A spring mechanism 246 acts on the connector 240 to force the engagement pieces 236, 238 in a generally clockwise direction 248. A pin 247 limits the distance in which the connector 240 and, thus, the engagement pieces 236, 238 may travel in the direction 248.

The cam mechanism 230 travels in a direction 245 in the cam 180. The cam 180 forces the connector 240 and the engagement pieces 236, 238 in a counter-clockwise direction 249. The force of the spring mechanism 246 forces the connector 240 and the engagement pieces 236, 238 in the opposite clockwise direction 248. Therefore, the engagement pieces 236, 238 are forced against the walls 186, 188 of the cam 180. The force applied to the walls 186, 188 causes a smoother and more precise movement of the belt 110. For example, there is very little slack in the movement of the belt 110, FIG. 2, due to spacing between the cam follower 230 and the cam 180. In addition, the drum 150 can operate in either direction wherein there is instantaneous or almost instantaneous movement of the belt 110 when the drum 150 changes direction.

The conveyor 100, FIG. 3, has been described above as having a chain connected between the cam followers 160 and the belt 110. In some embodiments, the chain 110 is not used. Rather, the cam followers 160 or the drive mechanisms 152 are connected directly to the belt 110, which negates the need for the chain 120. As described in greater detail below, by not using a chain, the conveyor 100 may not require sprockets on the ends 104, 106 to guide the chain. In other embodiments, a wire or cord (not shown) may be used in place of the chain 120. In such an embodiment, the drive mechanisms 152 or the cam followers 160 may be attached directly to the wire or cord.

Figure 12:
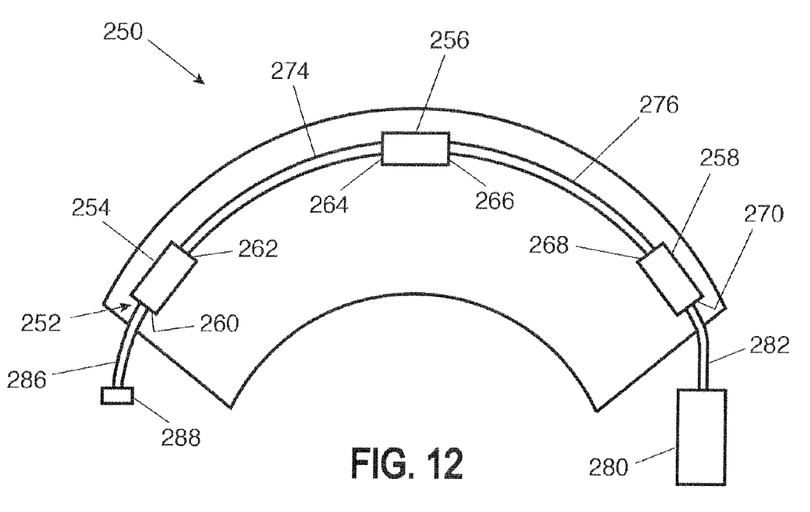
FIG. 12 is a top plan view of an embodiment of a conveyor housing having a plurality of drums driven by flexible shafts.

The drive mechanism for the drum 150, FIG. 4, has been described above as being a motor 130 that rotates the drum 150 via a belt, chain, or other such device. In some embodiments, the drum 150 has an internal motor and rotates about fixed points in a manner similar to the rotation of a motorized pulley. In other embodiments, flexible shafts are used to drive the drum 150. Reference is made to FIG. 12, which is a conveyor 250 having a plurality of drums 252 located therein. The conveyor 250 of FIG. 12 has the belt removed in order to illustrate the drums 252 within the conveyor 250.

The conveyor 250 has three drums 252 that are referred to individually as a first drum 254, a second drum 256 and a third drum 258. The drums 252 may be substantially identical to each other and may be substantially similar to the drum 150, FIG. 3. The first drum 254 has a first end 260 and a second end 262, wherein the second end 262 is configured to be connected to a flexible shaft. The second drum 256 has a first end 264 and a second end 266 wherein both ends 264, 266 are configured to be connected to flexible shafts. The third drum 258 also has a first end 268 and a second end 270. In the embodiment of FIG. 10, both the first end 268 and the second end 270 of the third drum 258 are configured to be connected to flexible shafts.

The first drum 254 is connected to the second drum 256 via a first flexible shaft 274. Likewise, the second drum 256 is connected to third drum 258 via a second flexible shaft 276. More specifically, the second end 262 of the first drum 254 is connected to the first end 264 of the second drum 256 by the first flexible shaft 274. The second end 266 of the second drum 256 is connected to the first end 268 of the third drum 258 by the second flexible shaft 276.

A motor 280 is connected to the drums 252 by way of a third flexible shaft 282. The third flexible shaft 282 enables the motor 280 to be located virtually anywhere. For example, the motor 280 may be a separate item from the conveyor 250 or may be affixed to virtually any component within the conveyor 250. As described below, the motor 280 may be connected to any of the drums 252 or either the first flexible shaft 274 or the second flexible shaft 276.

With additional reference to FIG. 4, the drums 252 all have cams similar to the cam 180 associated with the drum 150. The drums 252 are all located within the conveyor 250 so as to enable the cam followers 160 attached to the belt 110 to be received in the cams. The use of three drums 252 provides for three points of force application to the belt 110. The use of a plurality of points to apply power to the belt 110 may lengthen the belt life by spreading the force applied to the belt 110 over a greater area rather than applying the force to a single location on the belt 110. The use of a plurality of drums 252 may also enable the belt 110 to transfer greater loads by reducing the possibility of binding on the belt 110.

The conveyor 250 operates by engaging the motor 280, which causes the third flexible shaft 282 to rotate. The third flexible shaft 282 may be connected directly to the second end 270 of the third drum 258. Accordingly, the rotational motion of the motor 280 rotates the third drum 258 by way of the third flexible shaft 282. In many embodiments, there are no gears or other transmission elements between the motor 280 and the third drum 258 that may reduce the power delivered from the motor 280 to the third drum 258. In other embodiments, gears or other transmission devices may be located between the third drum 258 and the motor 280. These transmission devices may slow the speed of the third drum 258, which will deliver more force to the belt or they may increase the speed of the third drum 258, which will decrease the force applied to the belt.

Because the drums 252 are connected together by the flexible shafts 274, 276, when one drum rotates, all the drums 252 rotate. Therefore, when the motor 280 causes the third drum 258 to rotate, the first drum 254 and the second drum 256 will also rotate and they will rotate at the same speed as the third drum 258. Therefore, all the drums 252 may apply a force to move the belt from different locations on the belt. The belt will likely have a longer life due to the spacing of locations where force is applied.

The use of the flexible shafts connected between the drums 152 offers many advantages when used in a conveyor system. For example, several conveyors may be connected via flexible shafts. The conveyor 250 has a fourth flexible shaft 286 extending from the first side 260 of the first drum 254. The fourth flexible shaft 286 has a socket 288 that enables it to be connected to other conveyors as described below. It is noted that the fourth flexible shaft 286 extends from the conveyor 250 and may be connected to any of the other flexible shafts or drums 252 within the conveyor 250 so as to receive power from the motor 280.

Figure 13:
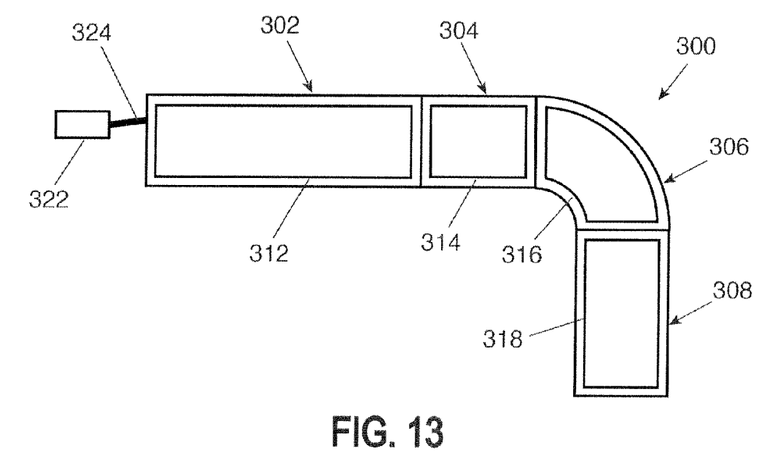
FIG. 13 is a schematic illustration of a plurality of conveyors mechanically connected together.

An example of a conveyor system 300 having a plurality of individual conveyors mechanically connected together is shown in FIG. 13. The conveyor system 300 includes a first conveyor 302 that is substantially straight and a second conveyor 304 that is also substantially straight. The second conveyor 304 is connected to a third conveyor 306 that is curved. The third conveyor 306 is connected to a fourth conveyor 308 that is substantially straight. The first conveyor 302 has a belt 312, the second conveyor 304 has a belt 314, the third conveyor 306 has a belt 316, and the fourth conveyor 308 has a belt 318. The conveyor system 300 also includes a motor 322 that is connected to the first conveyor 302 via a flexible shaft 324 or other mechanical transmission device.

Items are placed on the belt 312 of the first conveyor 302 and conveyed to the belt 318 on the fourth conveyor 308. In order to smoothly convey items, the belts 312-318 all have to be moving at the same speed. Otherwise, the items will tend to bunch up when they transition from a fast-moving belt to a slower moving belt. By coupling the conveyors together so that the belts are moved by the single motor 322, all the belts move at the same speed. In addition to having belts move at the same speed, the entire conveyor system 300 is able to be powered by the single motor 322. The rotational movement of the motor may directly turn drums in the conveyors, so transmission devices are not required in the conveyor system 300.

There may be occasions where the belts on the conveyor system 300 may need to move at precise, but different speeds relative to each other. Movement of the belts at different speeds may be accomplished by including gear boxes between the flexible shafts. More specifically, the speed of a belt 312 may be required to be ten percent slower than another belt 314. This slower speed can be accomplished by the addition of a gear box between the belts 312, 314. The speeds of the individual belts 312-318 may also be controlled by varying the pitch of the cams on the drums 252 as described above.

Referring to FIG. 1, in order to further improve the operation of the belt 110, the conveyer 100 may operate without pulleys or rollers that contact the belt 110. Accordingly, the conveyor 100 may not have rollers or pulleys on either the first end 104 or the second end 106. It is noted that conveyor 300 may also operate without the use of rollers or pulleys on the ends of the individual conveyors 302-308. The movement of the belt 110 is improved by not having rollers or pulleys at either end 104, 106 of the conveyor 100. More specifically, there is less friction and less noise by removing the rollers or pulleys on the ends 104, 106 of the conveyor 100 and having the belt 110 slide over a smooth surface than there is by using rollers or pulleys.

Figure 14:
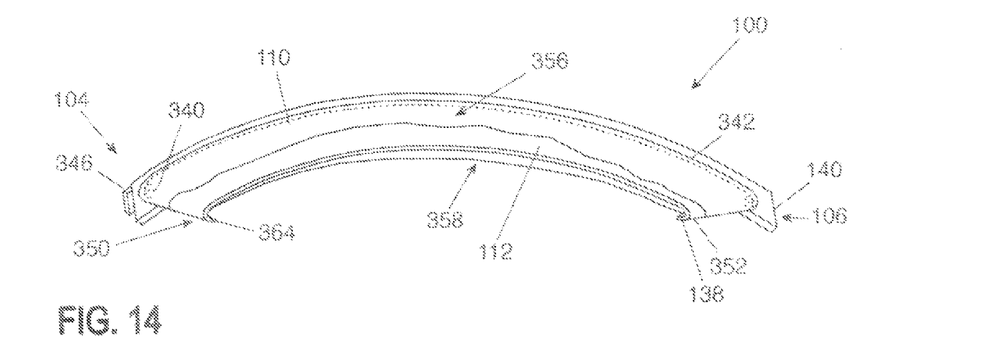
FIG. 14 is an isometric view of the conveyor of FIG. 1 with the conveyor belt partially cut away.

Conventional belt conveyors have rollers or pulleys on their ends that move with the belts as the belts transition between the top of the conveyor and the bottom of the conveyor. The conveyor 100 is described herein as lacking rollers or pulleys on at least one of the ends 104, 106 and the description of the conveyor 100 is applicable to the conveyor system 300. Reference is made to FIG. 14, which is an isometric view of the conveyor 100 of FIG. 1 with the belt 110 partially cut away. The ends 104, 106 of the conveyor 100 wrap in a direction that is generally toward the underside of the conveyor 100 to form curved ends. The bed 112 has a curved first end 350 and a curved second end 352. The belt 110 slides on the curved ends 350, 352 of the bed 112 rather than transitioning by way of a roller or pulley as with conventional conveyors. The terms rollers and pulleys sometimes apply to different items, however, they are used interchangeably herein and refer to devices that rotate about an axis and transition a belt from a first direction to a second direction.

Item are placed on the belt 110 and conveyed between the first end 104 and the second end 106 of the conveyor 100. This portion of the belt travel, where items are conveyed, is referred to as the first portion 356 of belt travel. The belt 110 has a return path that is under the bed 112. The belt 110 located under the bed 112 or opposite the bed 112 is referred to as being the second portion 358 of belt travel. The second portion 358 of belt travel is the portion of belt travel where no items are conveyed.

Figures 15, 16:
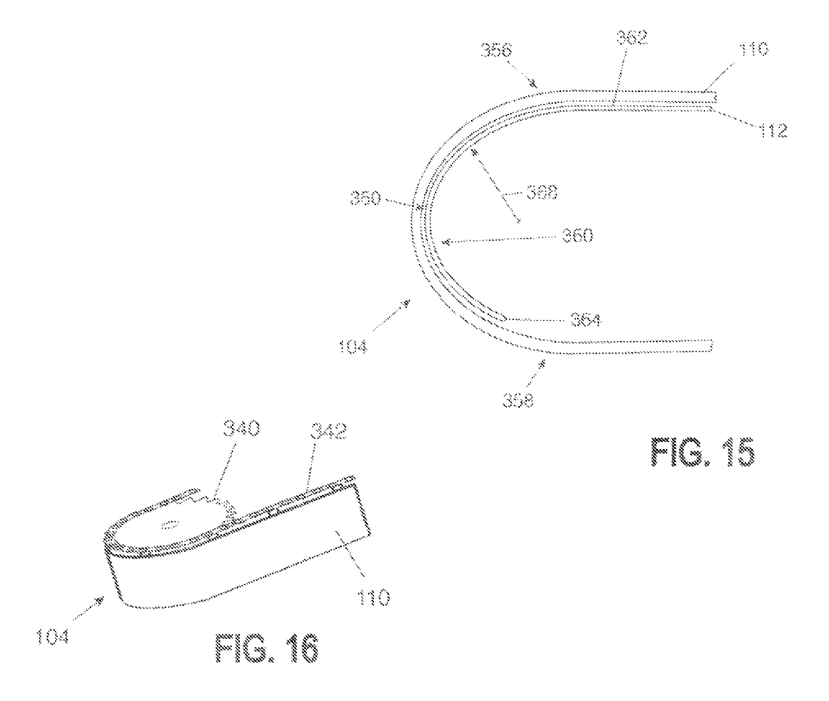
FIG. 15 is an enlarged side elevation view of the first end of the conveyor of FIG. 1.
FIG. 16 is a cutaway, side, isometric view of an embodiment of the conveyor of FIG. 14.

Reference is made to FIG. 15, which is an enlarged view of the first end 104 of the conveyor and shows the first end 350 of the bed 112. It is noted that the second end 352 of the bed 112 is substantially similar or identical to the first end 350. The first end 350 of the bed 112 has a curve 360. The curve 360 extends between a transition 362 and an edge 364. The transition 362 is a location on the bed 112 proximate where the travel portion 356 ends or where the planar portion of the bed 112 ends. The edge 364 is the end of the bed 112 or the end of the curve 360. As shown, the curve 360 may cause the edge 364 to be located under the bed 112. The belt 110 follows the curve 360 in the transition between the first and second portions 356, 358 of belt travel. The curve 360 may have a radius 368 at least partially located between the transition 362 and the edge 364. The radius 368 has an arc associated with it, wherein the arc extends between the transition 362 and the edge 364. In some embodiments, the radius 368 is approximately three inches. In some embodiments, the arc is approximately one-hundred eighty degrees. The arc may be greater or less than one-hundred eighty degrees. In other embodiments, the curve 360 is not circular and does not have a constant radius.

In use, the belt 110 slides on the bed 112. In doing so, the belt 110 slides on the curve 360 rather than moving over rotating rollers. Conventional conveyors use rollers on their ends, wherein the belt travels over the rollers during the transition between the first and second travel portions. It has been found that, contrary to conventional conveyor design, the rotation of rollers have more internal friction than the belt sliding on the curve 360. The belt 110 of the conveyor 100 described herein does not contact any rollers as it transitions between the first and second portions 356, 358 of travel. Rather, the belt 110 slides over the curve 360. Contrary to conventional conveyor design, the configuration of the conveyor 100 described herein uses less energy than conventional conveyors that use rollers for the belts between the first and second portions 356, 358 of belt travel. In addition, the rollers are noisy. It has been found that the conveyor 100 is quieter than conventional conveyors because there are not rollers or pulleys.

In some embodiments, the belt 110 is moved by way of a chain 342 that is connected to the belt 110 as shown in FIG. 16. The chain is moved by way of a sprocket 340 that engages the chain 342. As a power source (not shown) rotates the sprocket 340, the sprocket 340 moves the chain 342. Accordingly, the belt 110 moves as the chain 342 moves. The use of the sprocket 340 alleviates the need for the belt 110 to contact any rollers or pulleys in order to move.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A conveyor comprising
  a bed having a first end and a second end;
  a belt that is movable relative to the bed, wherein the belt is in a first portion of its travel when it is located adjacent the bed and wherein the belt is in a second portion of its travel when it is located opposite the bed; and
  a first curve located on the first end of the bed, wherein the belt contacts at least a portion of the first curve as the belt transitions between the first portion of travel and the second portion of travel; and
  a second curve located on the second end of the bed, wherein the belt contacts at least a portion of the second curve as the belt transitions between the first portion of travel and the second portion of travel;
  wherein the belt does not contact a roller.

2. The conveyor of claim 1, wherein the bed and the first curve form a continuous surface.

3. The conveyor of claim 1, wherein the first curve extends at least one-hundred eighty degrees.

4. The conveyor of claim 1, wherein the curve extends less than one-hundred eighty degrees.

5. The conveyor of claim 1, wherein the curve extends greater than one-hundred eighty degrees.

6. The conveyor of claim 1, wherein the first curve has an end and wherein the end is smooth.

7. The conveyor of claim 1 and further comprising a chain connected to the belt, wherein the belt is movable by way of a force applied to the chain.

8. The conveyor of claim 7 and further comprising at least one sprocket, wherein the chain contacts the sprocket.

9. The conveyor of claim 7 and further comprising a sprocket located at the first end of the bed wherein the chain contacts the sprocket as the belt transitions between the first travel portion and the second travel portion.

10. The conveyor of claim 7 and further comprising a sprocket located at the second end of the bed wherein the chain contacts the sprocket as the belt transitions between the first travel portion.

11. A conveyor comprising:
- a bed having a first end and a second end;
- a belt that is movable on the bed, wherein the belt is in a first portion of its travel when it is located adjacent the bed and wherein the belt is in a second portion of its travel when it is located opposite the bed;
- a first curve located on the first end of the bed, wherein the belt contacts at least a portion of the first curve as the belt transitions between the first portion of travel and the second portion of travel;
- at least one cam follower coupled to the belt;
- a drum comprising:
  - a first end;
  - a second end;
  - an exterior surface extending between the first end and the second end; wherein the drum is rotatable about an axis extending between the first end and the second end;
  - at least one cam located in the exterior surface, the at least one cam spiraling between the first end and the second end, and wherein the at least one cam follower is receivable in the at least one cam.

12. The conveyor of claim 11, wherein the belt has a chain attached thereto, and wherein the at least one cam follower is connected to the chain.

13. A conveyor comprising
- a bed having a first end and a second end wherein the bed forms an arc between the first end and the second end;
- a belt, wherein the belt is slidable on the bed, wherein the belt is in a first portion of its travel when it is located adjacent the bed, wherein the belt is in a second portion of its travel when it is located opposite the bed, and wherein the belt does not contact a roller;
- a first curve located on the first end of the bed, wherein the belt contacts at least a portion of the first curve when the belt is between the first portion of travel and the second portion of travel; and
- a second curve located on the second end of the bed, wherein the belt contacts the second curve when the belt is between the first portion of travel and the second portion of travel.

14. The conveyor of claim 13, wherein the first curve terminates with an edge and wherein the belt does not contact the edge.

15. The conveyor of claim 13, wherein the curve has an arc distance of approximately one hundred eighty degrees.

16. The conveyor of claim 13, wherein the belt does not contact a roller in the transition between the first portion of travel and the second portion of travel.

17. The conveyor of claim 1, wherein the first curve, the second curve, and the bed form a continuous surface.

18. The conveyor of claim 13, wherein the first curve, the second curve, and the bed form a continuous surface.

* * * * *